(12) United States Patent
Earner et al.

(10) Patent No.: US 10,824,250 B1
(45) Date of Patent: Nov. 3, 2020

(54) TOUCHSCREEN STYLUS ASSEMBLY

(71) Applicants: Margaret Earner, Knoxville, TN (US); Yolanda Arvizu, Knoxville, TN (US)

(72) Inventors: Margaret Earner, Knoxville, TN (US); Yolanda Arvizu, Knoxville, TN (US)

( * ) Notice: Subject to any disclaimer, the term of this patent is extended or adjusted under 35 U.S.C. 154(b) by 0 days.

(21) Appl. No.: 16/433,878

(22) Filed: Jun. 6, 2019

(51) Int. Cl.
  *G06F 3/033* (2013.01)
  *G06F 3/0354* (2013.01)
  *G06F 3/041* (2006.01)

(52) U.S. Cl.
  CPC ........ *G06F 3/03545* (2013.01); *G06F 3/0412* (2013.01)

(58) Field of Classification Search
  CPC ........................... G06F 3/03545; G06F 3/0412
  See application file for complete search history.

(56) References Cited

U.S. PATENT DOCUMENTS

| | | | | |
|---|---|---|---|---|
| 4,775,765 A | * | 10/1988 | Kimura | G06F 3/0414 338/99 |
| 6,225,988 B1 | * | 5/2001 | Robb | G06F 3/039 345/173 |
| 6,249,277 B1 | * | 6/2001 | Varveris | G06F 3/039 294/25 |
| 8,169,422 B2 | | 5/2012 | Flachsbart | |
| D692,888 S | | 11/2013 | Moore | |
| D701,861 S | | 4/2014 | Foster | |
| 8,730,194 B2 | | 5/2014 | Vellanki | |
| 8,970,559 B1 | | 3/2015 | McVickar | |
| 9,282,801 B2 | | 3/2016 | Yumoto | |
| 2005/0093835 A1 | | 5/2005 | Mortarelli | |
| 2005/0231471 A1 | * | 10/2005 | Mallard | A41D 19/0024 345/156 |
| 2008/0297493 A1 | * | 12/2008 | Adkins | G06F 3/03545 345/179 |
| 2009/0078478 A1 | * | 3/2009 | Newman | G06F 3/03545 178/19.01 |
| 2009/0096746 A1 | * | 4/2009 | Kruse | G06F 3/014 345/156 |
| 2009/0278818 A1 | * | 11/2009 | DiNozzi | G06F 3/014 345/179 |
| 2009/0289893 A1 | | 11/2009 | Drangel | |
| 2012/0137403 A1 | | 6/2012 | Bone | |
| 2013/0207900 A1 | * | 8/2013 | Harooni | G06F 3/039 345/173 |
| 2014/0320453 A1 | * | 10/2014 | Vellanki | G06F 3/044 345/174 |
| 2015/0153849 A1 | | 6/2015 | Escue | |
| 2015/0282533 A1 | * | 10/2015 | Jiang | A41D 1/00 2/69 |
| 2017/0031469 A1 | * | 2/2017 | Grossman | G06F 3/014 |
| 2019/0200723 A1 | * | 7/2019 | Atlas | A45D 31/00 |

FOREIGN PATENT DOCUMENTS

| | | |
|---|---|---|
| JP | 2000172408 A * | 6/2000 |
| JP | 2009259062 A * | 11/2009 |

* cited by examiner

*Primary Examiner* — Joe H Cheng

(57) ABSTRACT

A touchscreen stylus assembly for enabling use of a fingernail to interact with a capacitive touchscreen includes a plate, which is both conductive and flexible. The plate has opposing sides that extend arcuately between a first end and a second end so that the second end is narrower than the first end. A coupler that is coupled to the first end of the plate is configured to removably couple the plate to a tip of a fingernail of a user. The user thus is positioned to utilize the plate as a stylus to interact with a capacitive touchscreen.

9 Claims, 4 Drawing Sheets

TOUCHSCREEN STYLUS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to stylus assemblies and more particularly pertain to a new stylus assembly for enabling use of a fingernail to interact with a capacitive touchscreen.

BRIEF SUMMARY OF THE INVENTION

An embodiment of the disclosure meets the needs presented above by generally comprising a plate, which is both conductive and flexible. The plate has opposing sides that extend arcuately between a first end and a second end so that the second end is narrower than the first end. A coupler that is coupled to the first end of the plate is configured to removably couple the plate to a tip of a fingernail of a user. The user thus is positioned to utilize the plate as a stylus to interact with a capacitive touchscreen.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
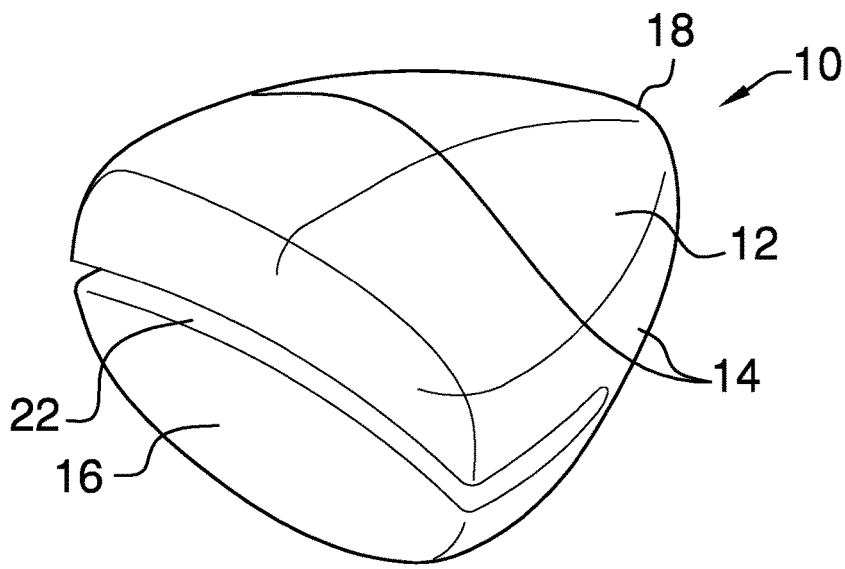
FIG. 1 is an isometric perspective view of a touchscreen stylus assembly according to an embodiment of the disclosure.
Figure 2:
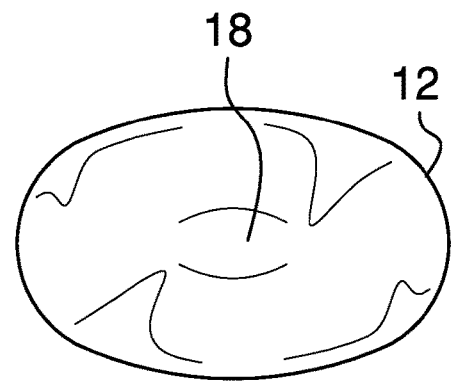
FIG. 2 is an end view of an embodiment of the disclosure.
Figure 3:
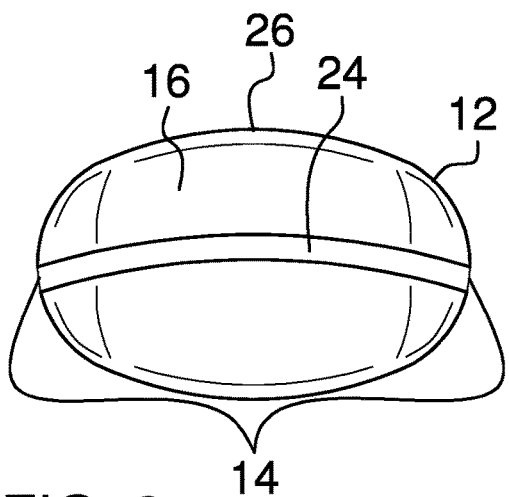
FIG. 3 is an end view of an embodiment of the disclosure.

With reference now to the drawings, and in particular to FIGS. 1 through 9 thereof, a new stylus assembly embodying the principles and concepts of an embodiment of the disclosure and generally designated by the reference numeral 10 will be described.

Figure 4:
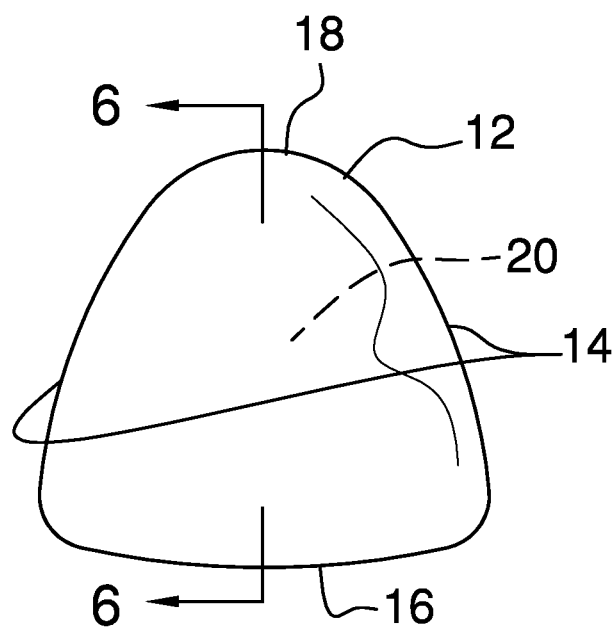
FIG. 4 is a bottom view of an embodiment of the disclosure.
Figure 5:
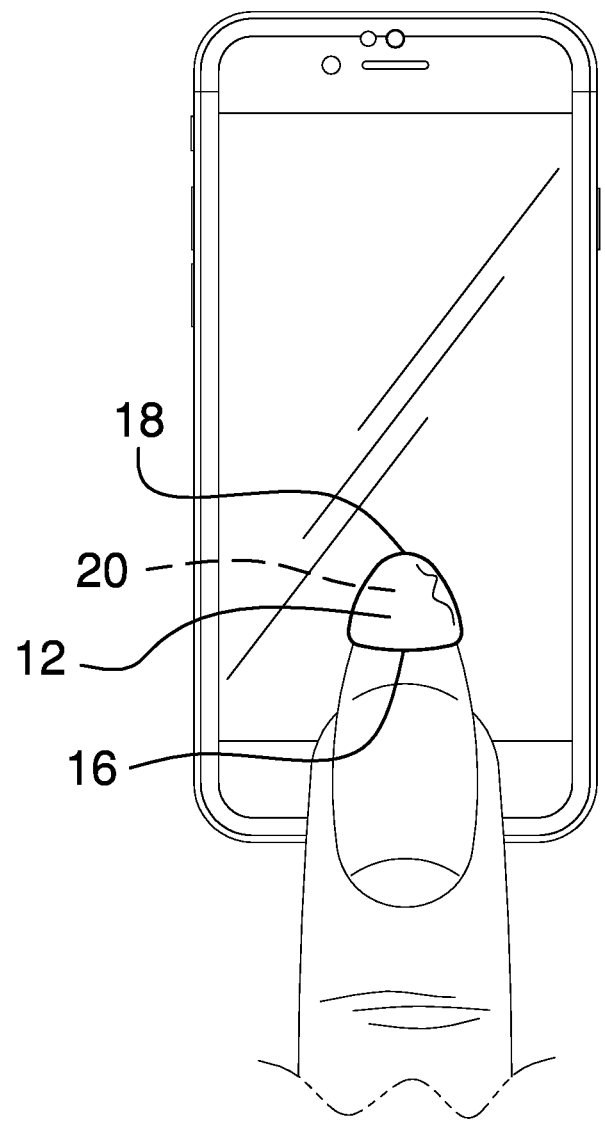
FIG. 5 is an in-use view of an embodiment of the disclosure.
Figure 6:
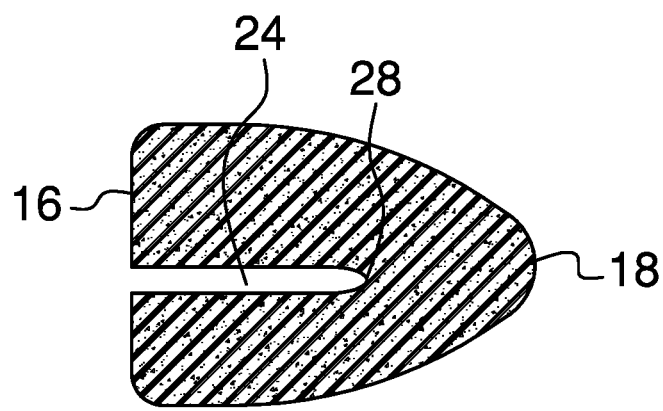
FIG. 6 is a cross-sectional view of an embodiment of the disclosure.
Figure 7:
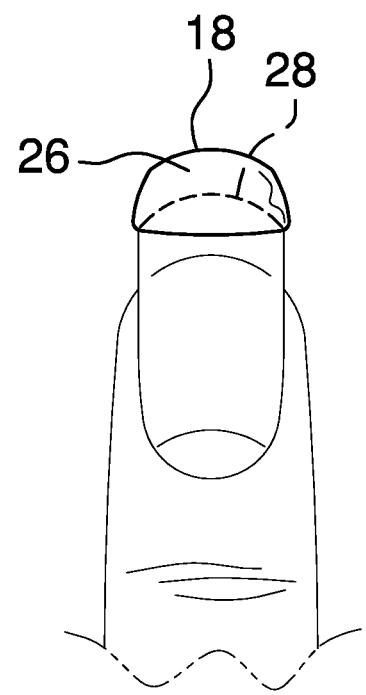
FIG. 7 is a top view of an embodiment of the disclosure.
Figure 8:
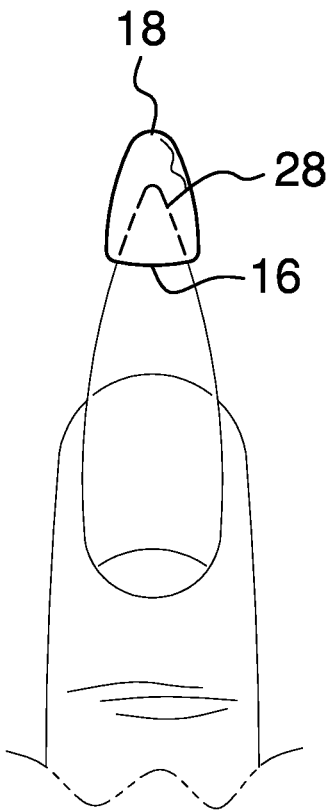
FIG. 8 is a top view of an embodiment of the disclosure.
Figure 9:
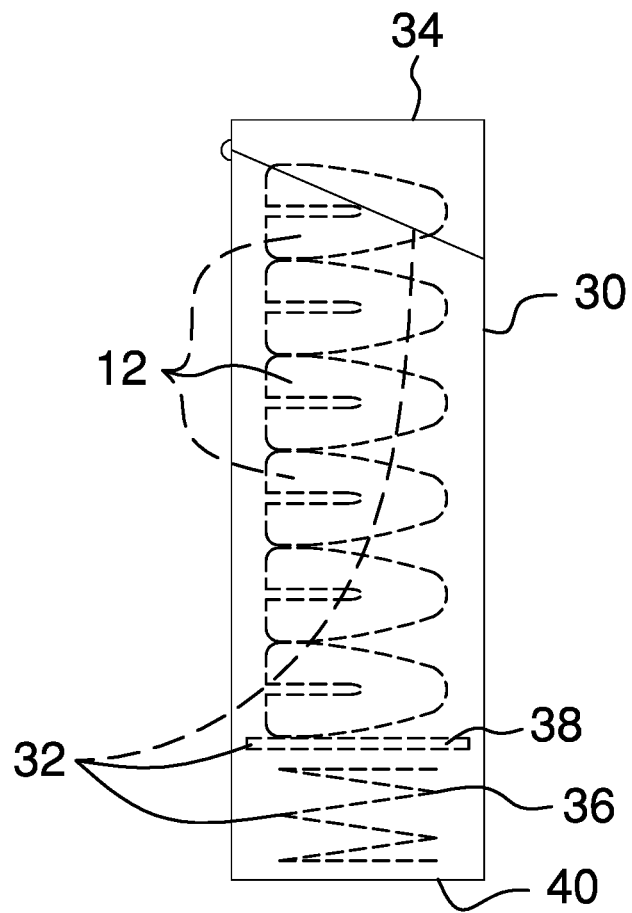
FIG. 9 is a side view of an embodiment of the disclosure.

As best illustrated in FIGS. 1 through 9, the touchscreen stylus assembly 10 generally comprises a plate 12, which is both conductive and flexible. The plate 12 has opposing sides 14 that extend arcuately between a first end 16 and a second end 18 so that the second end 18 is narrower than the first end 16. The second end 18 is arcuate. The lengths of the opposing sides 14 may be varied, thus providing a plate 12 that short and which has a second end 18 that is wide, as shown in FIG. 7, a plate 12 that is long and which has a second end 18 that is narrow, as shown in FIG. 8, or a plate 12 that is of medium length and which has a second end 18 that is of medium width, as shown in FIG. 4. The plate 12 comprises conductive elastomer. The plate 12 comprises a conductor 20, such as graphite, silica, or the like, and at least one of rubber and silicone.

A coupler 22 that is coupled to the first end 16 of the plate 12 is configured to removably couple the plate 12 to a tip of a fingernail of a user. The user thus is positioned to utilize the plate 12 as a stylus to interact with a capacitive touchscreen. For users with longer fingernails, the fingernails often make it difficult to interact with a capacitive touchscreen, leading to errors in activating a target on the screen. For example, when targeting a letter of a keyboard on the capacitive touchscreen, the user may inadvertently hit an adjacent letter, causing a spelling error.

The coupler 22 comprises a slit 24 that extends into the plate 12 from the first end 16. The slit 24 is configured to insert the tip of the fingernail to removably couple the plate 12 to the fingernail. The slit 24 extends arcuately between the opposing sides 14 of the plate 12 so that the slit 24 is convex when viewed from a top 26 of the plate 12. The slit 24 is substantially complementary to a curvature of the fingernail. The slit 24 has a boundary 28, which is distal from the first end 16, that is at least one of flat (not shown), arcuate as shown in FIG. 7, and pointed as shown in FIG. 8, so that the boundary 28 is configured to match a shape of the tip of the fingernail. The coupler 22 also may comprise pressure sensitive adhesive, or the like.

The assembly 10 also comprises a container 30 that is configured to position a plurality of the tips 12. The container 30 comprises a dispensing means 32 that is adapted to deliver one plate 12 upon each articulation of a lid 34 of the container 30. The dispensing means 32 comprises a spring 36 and a push plate 38. The spring 36 is helical type and is coupled to a base 40 of the container 30 distal from the lid 34. The push plate 38 is coupled to the spring 36 distal from the base 40 of the container 30. These types of containers are well known to those skilled in the art of containers having a dispensing means and are referred to a PEZ™-like dispensers.

In use, the plate 12 is coupled to the fingernail of the user by inserting the tip of the fingernail into the slit 24. The user thus is positioned to utilize the plate 12 as a stylus to interact with a capacitive touchscreen.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A touchscreen stylus assembly comprising:
   a plate having opposing sides extending arcuately between a first end and a second end such that the second end is narrower than the first end, the plate being conductive and flexible;
   a coupler coupled to the first end of the plate, the coupler being configured for removably coupling the plate to a tip of a fingernail of a user positioning the user for utilizing the plate as a stylus for interacting with a capacitive touchscreen; and
   a container configured for positioning a plurality of the tips, the container comprising a dispensing means adapted for delivering one plate upon each articulation of a lid of the container.

2. The assembly of claim 1, further including the second end being arcuate.

3. The assembly of claim 1, further including the plate comprising conductive elastomer.

4. The assembly of claim 3, further including the plate comprising a conductor and at least one of rubber and silicone.

5. The assembly of claim 1, further including the coupler comprising a slit extending into the plate from the first end wherein the slit is configured for inserting the tip of the fingernail for removably coupling the plate to the fingernail.

6. The assembly of claim 5, further including the slit extending arcuately between the opposing sides of the plate such that the slit is convex when viewed from a top of the plate such that the slit is substantially complementary to a curvature of the fingernail.

7. The assembly of claim 5, further including the slit have a boundary distal from the first end, the boundary being at least one of flat, arcuate, and pointed wherein the boundary is configured for matching a shape of the tip of the fingernail.

8. The assembly of claim 1, further including the dispensing means comprising a spring and a push plate, the spring being helical type and coupled to a base of the container distal from the lid, the push plate being coupled to the spring distal from the base of the container.

9. A touchscreen stylus assembly comprising:
   a plate having opposing sides extending arcuately between a first end and a second end such that the second end is narrower than the first end, the plate being conductive and flexible, the second end being arcuate, the plate comprising conductive elastomer, the plate comprising a conductor and at least one of rubber and silicone;
   a coupler coupled to the first end of the plate, the coupler being configured for removably coupling the plate to a tip of a fingernail of a user positioning the user for utilizing the plate as a stylus for interacting with a capacitive touchscreen, the coupler comprising a slit extending into the plate from the first end wherein the slit is configured for inserting the tip of the fingernail for removably coupling the plate to the fingernail, the slit extending arcuately between the opposing sides of the plate such that the slit is convex when viewed from a top of the plate such that the slit is substantially complementary to a curvature of the fingernail, the slit have a boundary distal from the first end, the boundary being at least one of flat, arcuate, and pointed wherein the boundary is configured for matching a shape of the tip of the fingernail; and
   a container configured for positioning a plurality of the tips, the container comprising a dispensing means adapted for delivering one plate upon each articulation of a lid of the container, the dispensing means comprising a spring and a push plate, the spring being helical type and coupled to a base of the container distal from the lid, the push plate being coupled to the spring distal from the base of the container.

\* \* \* \* \*